Figure 1:
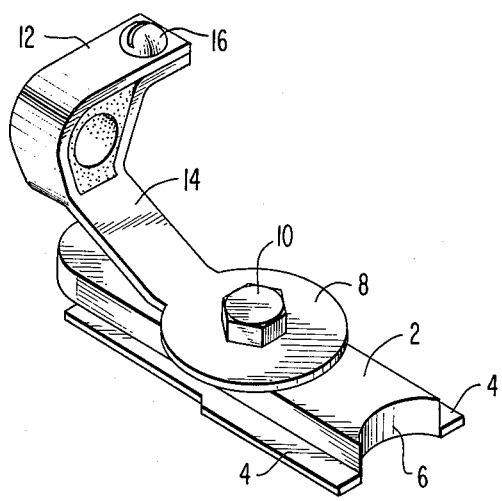

United States Patent [19]
Carson

[11] 3,931,998
[45] Jan. 13, 1976

[54] BLOWOUT PREVENTING DEVICE FOR VEHICLE WHEELS

[76] Inventor: William H. Carson, Helenwood, Tenn. 37755

[22] Filed: Oct. 23, 1974

[21] Appl. No.: 517,349

[52] U.S. Cl.................. 301/63 R; 152/429; 301/97
[51] Int. Cl.². ........................................... B60B 1/06
[58] Field of Search............. 301/5 R, 63 R, 95, 96, 301/97; 152/429, 396, 402, 405

[56] References Cited
UNITED STATES PATENTS
3,195,605   7/1965   Mayfield............................. 152/429

*Primary Examiner*—M. Henson Wood, Jr.
*Assistant Examiner*—D. W. Keen
*Attorney, Agent, or Firm*—Browne, Beveridge, DeGrandi & Kline

[57] ABSTRACT

A blowout preventing device is disclosed for attachment to vehicle wheels which have axially-elongated slots for receiving inner tube inflation stems. The device comprises a rigid filler piece which has a central portion for filling the slot and a circumferentially enlarged outer retainer portion which prevents radially inward displacement of the filler piece. An inner retainer means clamps the central portion to the inner face of the rim to prevent the device from falling into the tire in the event of deflation of the inner tube. Associated with the inner retainer means is a gripping means for engaging an inflation stem to prevent it from falling into the tire upon deflation.

4 Claims, 3 Drawing Figures

U.S. Patent  Jan. 13, 1976  3,931,998

BLOWOUT PREVENTING DEVICE FOR VEHICLE WHEELS

This invention relates to a blowout preventing device for vehicle wheels.

This invention is particularly suited for use in connection with the large wheel assemblies used on commercial transport trucks. These wheels and their associated tires are extremely large, heavy and strong which under some circumstances may severely complicate the task of placing a tire on the wheel. To simplify the task of mounting tires on such wheels, some wheels are provided with an axially-elongated slot which extends to the center of the rim. The purpose of this slot is to enable an inflation stem to slide axially in the slot until it reaches the center of the rim.

Previously, it has been recognized that the elongated slot creates an area of weakness. It has been a practice to reinforce this area by means of a liner member, sometimes called a "reliner" in the trade. The liner is a fabric-reinforced piece of rubber having a midsection which conforms to the outer wall of the rim, and flared, downwardly-projecting portions which are designed to lie against the interior wall of the tire adjacent the tire bead.

Commercial truck tires are subjected to prolonged extreme conditions of temperature and pressure. Under these conditions, liners are sometimes forced inwardly through the elongated slot in the rim, becoming distorted and leading to failure of the liner and a tire blowout.

When a blowout occurs, the inflation stem of the inner tube can fall into the interior of the tire, permanently destroying in some cases both the inner tube and the tire. Thus, it will be recognized that serious consequences may result from a simple blowout through the reliner in the area of the elongated wheel slot. A safety hazard is created first when the moving vehicle loses control at the point of blowout, and then after the vehicle is stopped where it may be struck by moving vehicles. Transport schedules are not met, and expensive equipment remains idle because of a simple blowout. Further, there may be needless destruction of the inner tube, liner and possibly the tire, all of which may be avoided by adoption of the present invention.

Throughout this specification, the terms "inner" and "outer" are used to express relationships along radial lines extending from the center of a wheel. Mention of circumferential dimensions refers to directions which lie on arcs generated from the wheel axis.

According to this invention, the slot and the wheel rim is obstructed by a blowout preventing device which has a rigid filler piece with a central portion and a retainer portion. The central portion lies in the slot, and the outer retainer portion is circumferentially enlarged to prevent radial inward displacement of the filler piece. To prevent the device from falling into the tire upon deflation of the inner tube, there is provided an inner retainer means which clamps the central portion to the face of the wheel rim. This inner retainer means may also carry a gripping means for engaging the inner tube inflation stem, thus preventing the inflation stem from falling outwardly into the tire when the inner tube is deflated.

The primary object of the invention is to prevent certain types of blowouts.

Another object is to prevent destruction to tubes and tires in the event of tire deflation.

A further object of the invention is to provide a blowout preventing device which is easily installed even after a tire and its inner tube are already placed on the wheel rim.

Briefly, these and other objects of the invention are satisfied by a wheel assembly which has a vehicle wheel assembly comprising, a wheel having a rim provided with an axially elongated slot, an inner tube provided with an axially elongated inflation stem which is movable through the slot during placement of the inner tube on the wheel, a rigid filler piece positioned in the slot, said filler piece having an outer retainer portion and a central portion lying within the slot, said central portion having an abutment surface at one end thereof for confronting the stem of the inner tube in the plane of the rim, said abutment surface being open-ended with no obstructions lying axially thereof whereby the filler piece may be moved into position against a stationary inflation stem, said outer retainer portion positioned between the rim and the inner tube, said outer retainer portion being integral with the central portion and extending beyond the slot in a circumferential direction to lie against the wheel and prevent displacement of the filler piece from the rim in a radially inward direction, and inner retainer means for clamping the central portion to the inner face of the rim to prevent separation of the filler piece from the wheel upon deflation of the inner tube.

Figure 2:
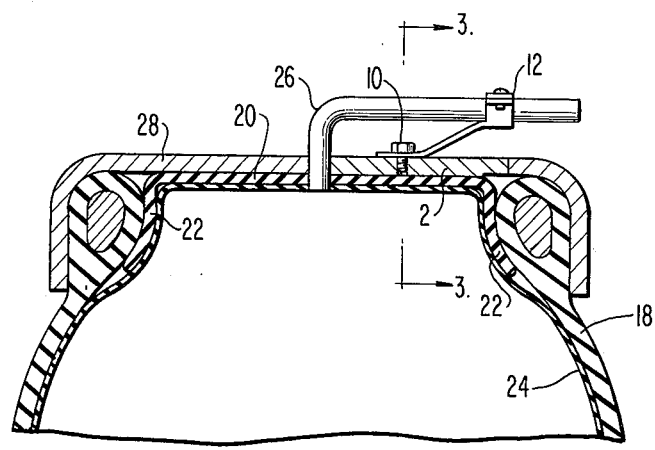
Figure 3:
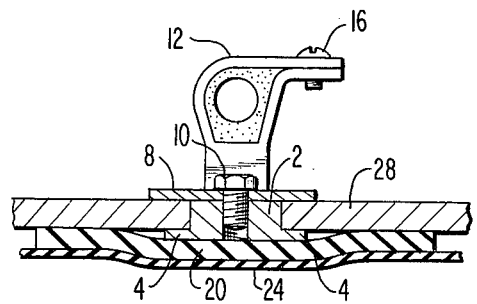

For a more complete understanding of the invention, attention is directed to the accompanying drawings wherein, FIG. 1 is a perspective view of a preferred form of the invention;

FIG. 2 is a sectional view of the device according to the invention in combination with a vehicle wheel, tire, tube and liner; and FIG. 3 is a sectional view as seen along 3—3 in FIG. 2, with the inflation stem having been removed for clarity.

Referring to FIG. 1, it will be seen that the device includes a filler piece, preferably formed of a rigid metal such as steel, and provided with a central portion 2 and a circumferentially enlarged outer retainer portion 4.

At the end of the thickened central portion 2 of the filler piece is an arcuate abutment surface 6 which is designed to confront one side of the inflation stem as it passes outwardly through the rim of the wheel.

The central portion 2 has a thickness approximately equal to the thickness of the wheel rim so that it serves as a filler within the rim. Lying on the inner surface of the central portion 2 is a washer-like piece 8 which may be drawn downwardly toward the upper surface of the central portion 2 by means of a bolt 10. The bolt 10 and the washer-like piece 8 serve as an inner retaining means which is used to clamp the central portion 2 of the filler piece to the inner face of a wheel rim, thereby preventing separation of the filler piece from the wheel upon deflation of the inner tube located within the tire.

Another potential danger of tire deflation is that the inflation stem of an inner tube may fall into the tire and permanently damage it. This is prevented to a large extent by the filler piece itself, but it is desirable to take further precautions by connecting the inflation stem to the filler piece. In the preferred and illustrated embodiment, this is done by means of a contractible clamp 12 which is connected to the washer-like piece by an integral neck 14. The clamp 12 is formed of the same piece of material as the washer-like piece 8 and the neck 14, and it is lined with a resilient material with a high coefficient of friction, of which rubber is an example. Once the inflation stem is inserted through the clamp 12, the clamp is contracted by turning the clamp screw 16 to hold the axially-extending leg of the elongated inflation stem in position.

The manner in which the device is used in a tire installation is illustrated in FIGS. 2 and 3. The filler piece completely occupies the elongated slot in the wheel rim, and its inward movement is prevented by the outer retaining flange 4. The tire 18 is positioned on the wheel, and a liner has a base portion 20 lying against the outer surface of the rim and leg portions 22 which lie against the bead of the tire. In a usual fashion, an inner tube 24 within the tire has its inflation stem 26 extending radially inwardly before bending to an axial leg which simplifies access to its inflation opening.

Under normal conditions, the inflation of the inner tube 24 will create forces which drive the liner 20 against the wheel rim 28, exerting a force which is upward in FIG. 2, acting on the lower surface of the filler piece. This drives the retainer flange 4 against the outer wall of the rim adjacent to the elongated slot, thus holding the filler piece in position.

In order to simplify installation of the device of this invention, and also to prevent it from damaging a tire in the event of unintentional deflation, means are provided for clamping the central portion 2 of the device to the inner face of the rim to prevent separation of the filler piece from the wheel upon deflation of the inner tube. This retainer is the previously-described washer-like piece and its associated nut 10 which is rotated to draw the washer-like piece 8 downwardly to the position best seen in FIG. 3.

An important secondary function of the washer-like piece is that it provides a mounting base for a gripping means for engaging the inflation stem 26. As described above, the washer-like piece 8 has an integral neck 14 extending upwardly to a point where it is bent into a loop which is closed and circumferentially contracted about the inflation step by the clamp screw 16. Thus, when the inflation stem is positively engaged by the gripping means 12, it cannot fall into the tire to cause damage to the tire and inner tube when the tire becomes deflated.

Those skilled in the art will recognize the urgent need for this invention, inasmuch as blowouts occuring through the inflation stems slots are an extremely serious and troublesome problem.

Although only a preferred embodiment of the invention has been shown, it can be readily recognized that the invention may take many other forms without departing from the basic principles outlined hereinabove. In some cases, the gripping means 12 may be dispensed with. In such a case, it is possible to use simply an enlarged bolt 10, having a head larger than the circumferential dimension of the central portion 2 thus rendering the washer-like piece 8 unnecessary. Many other modifications will occur, so it is emphasized that the invention is not limited only to the specific embodiment described herein, but encompasses various modifications, improvements and substitutions therefore which fall within the spirit of the claims which follow.

I claim:
1. A vehicle wheel assembly comprising,
a wheel having a rim provided with an axially elongated slot,
an inner tube provided with an axially elongated inflation stem which is movable through the slot during placement of the inner tube on the wheel,
a rigid filler piece positioned in the slot, said filler piece having an outer retainer portion and a central portion lying within the slot,
said central portion having an abutment surface at one end thereof for confronting the stem of the inner tube in the plane of the rim,
said abutment surface being open-ended with no obstructions lying axially thereof whereby the filler piece may be moved into position against a stationary inflation stem,
said outer retainer portion being integral with the central portion and extending beyond the slot in a circumferential direction to lie against the wheel and prevent displacement of the filler piece from the rim in a radially inward direction, and
inner retainer means for clamping the central portion to the inner face of the rim to prevent separation of the filler piece from the wheel upon deflation of the inner tube.

2. The vehicle wheel assembly of claim 1 having gripping means connected to the filler piece for engaging said inflation stem, whereby the inflation stem remains affixed to said wheel upon deflation of the inner tube.

3. The vehicle wheel assembly of claim 2 wherein the retainer means includes a retainer member which is circumferentially larger than the wheel slot, a fastener engaged with the central portion of the filler piece and the filler member to impose a clamping force between the filler piece and the retainer member, said gripping means for engaging the inflation stem being connected to the retainer member.

4. The vehicle wheel assembly of claim 2 wherein the clamping means and the gripping means are formed of a unitary piece of sheet material, said clamping means including a washer-like portion at one end of the unitary piece of sheet material, said gripping means including a contractible closed loop at the other end of the unitary piece of sheet material.

* * * * *